Patented Oct. 30, 1928.

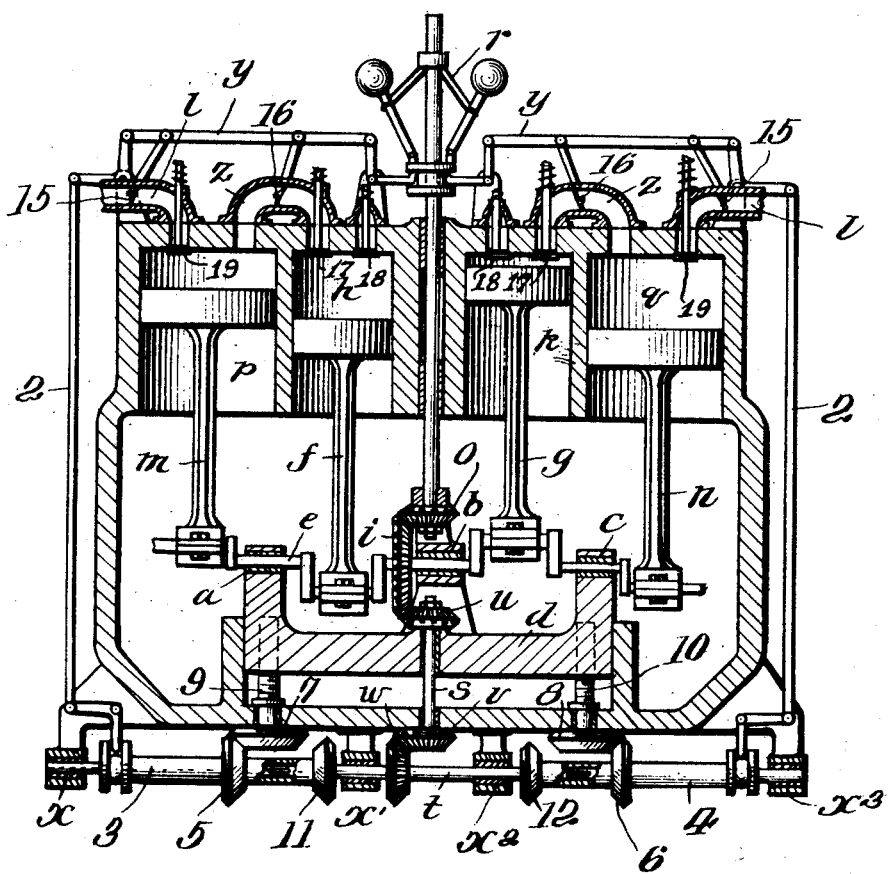

1,690,080

UNITED STATES PATENT OFFICE.

MANFRED SENG, OF BERLIN, GERMANY, AND ANTHONY GEORGE MALDON MICHELL, OF MELBOURNE, VICTORIA, AUSTRALIA, ASSIGNORS TO MICHELL-CRANKLESS ENGINES CORPORATION, OF NEW YORK, N. Y., A CORPORATION OF NEW YORK.

SUPERCHARGER INTERNAL-COMBUSTION ENGINE AND METHOD OF SUPERCHARGING.

Application filed July 27, 1927, Serial No. 208,770, and in Germany July 15, 1926.

Internal combustion engines with supercharging are known, the principle of which is the introduction into the cylinder of more combustible mixture than would be taken in by simple induction. The supercharging is commenced at a certain rate of speed and is started and stopped by the driver. By this means peak performances are attained which are well known from race reports.

In contradistinction thereto the inventors start from a fundamentally different idea in that they effect the supercharging in the lowest range of revolution speeds, at which the charging is preferably the most complete, in order to obtain an increase of power or torque at such speeds; and decrease the supercharging in the upper range of revolutions relatively to the lower, the supercharging being in certain circumstances reduced to zero in the uppermost range of revolution.

The feed pipes for the gas mixture should be so dimensioned that at the highest speed of revolution, good mixture formation, and charging of the cylinders are attained. Since however these constructional proportions are then unfavorable for the lower range of speeds, according to the present invention supercharging is effected in the said lower range.

As is well known, the supercharging for any internal combustion engine must be adapted to the thermal conditions. The supercharging is limited in the lower range of speeds by the occurrence of self ignition and in the upper range of speeds, moreover, by the maximum value of the thermal loading to which the parts of the engine may be subjected.

The amount of the supercharging may either be maintained constant from the lowest speeds upwards, until the heating of the engine parts due to the increase of speed becomes dangerous in which case said supercharging is cut out by hand or automatically, or the amount of the supercharging is gradually reduced with increasing speeds, which may also be effected by hand (for example with the aid of indicating devices) or automatically.

The regulation of the supercharging may be performed by setting in or out of operation, depending on whether the supercharging action is desired or not, of a supercharging device of any suitable type coupled to the internal combustion engine. This setting in and out of operation may be effected by the driver or by an automatic device. Such a device may consist of a centrifugal governor or of a diaphragm or the like influenced by the pressure or pressure differences prevailing in the gas pipes.

Constructions are however also possible wherein the supercharging device is permanently coupled with the engine. In this case the supercharging may be regulated by modifying the cross section of the conduit connecting the supercharger and the engine cylinder or by some other kind of volumetric control of the supercharger. Thus regulation may be effected automatically by the pressure existing in the suction pipe of the engine, the said pressure, for example, operating a relay which in turn acts upon the feed pipe.

The amount of the supercharging is advantageously maintained in the correct relation to the thermal conditions of the engine; for example, the supercharging being decreased with increasing revolutions.

Apart from the properties of the mixture and the size of the compression space above the piston when the latter is in its extreme outer position, the compression ratio also influences the value of the torque. In accordance therefore with a further feature of the present invention, the piston chamber is enlarged with increasing supercharging until such a size is reached that the self ignition is then impossible. In this manner the amount of the charge, limited by self ignition, is also increased. The increase of the compression space beyond the value correct for an engine without supercharging may be constant, that is, the engine may have dimensions exceeding the normal. It may, however, also be variable by means, for example, of an adjustable cylinder cover or adjustable crank shaft bearings. The variation may be controlled automatically by means, for example, of a centrifugal governor or by some other device which reduces the compression space with increasing engine speeds and falling supercharging.

An enlarged constant compression space constitutes a compromise in so far as the volumetric and thermal conditions of the engine become less favorable with decreasing supercharging. However by renouncing maximum outputs at the high speeds, the economical value of the engine is not necessarily impaired. The object of the invention is to increase the elasticity of high speed engines by increasing the torque in the lower range of speeds.

There are fuels with low and fuels with high self ignition points and on the latter the dimensions of the compression space must depend. If the self ignition point is sufficiently high, then, it is not necessary to increase the size of the compression space beyond the value usual with engines without supercharging.

The invention is illustrated diagrammatically and by way of example in its application to a two cylinder internal combustion engine. Piston rods $f$, $g$ of the engine cylinders $h$ and $k$ respectively and piston rods $m$, $n$ of the charging pumps $p$ and $q$ engage with the crank shaft $e$ journalled at $a$, $b$ and $c$ in the bearing frame $d$.

The shaft $e$ causes displacement of the centrifugal governor $r$ through the bevel wheel $i$ keyed on said shaft and the bevel wheel $o$ in permanent engagement therewith; furthermore said shaft $e$ drives the shaft $t$ which is journalled at $x$, $x'$, $x^2$ and $x^3$ through the bevel wheel $u$, also in permanent engagement with the wheel $i$, and by way of the shaft $s$ and pair of bevel wheels $v$, $w$. Any suitable splined connection may be made between the bevel wheel $v$ and the shaft $s$, whereby the wheel will rotate with the shaft, but will permit a sliding movement of the shaft therethrough.

The centrifugal governor $r$ when raised due to increasing speed of rotation throttles, through the agency of rod gear $y$, the transfer pipes $z$ between the charging pumps $p$ and $q$ and the engine cylinders $h$ and $k$ respectively as well as the feed pipe $l$ to each of the charging pumps. The engine cylinders $h$ and $k$ are represented as having the intake valves 17 connected with the transfer pipes $z$, and the exhaust valves 18, it being understood that these valves are operated in any well known manner, not shown. The inlet conduits $l$ for the superchaging pumps are provided with the inlet valves 19.

At the same time by means of the rods 2 pivoted to the rod gear $y$ said governor displaces the sleeves 3 and 4, which are mounted on the shaft $t$ in such a manner as to be capable of longitudinal movement relatively thereto and are constrained to partake of the rotation thereof by means of a tongue and groove. By this displacement the bevel wheels 5 and 6 mounted on the sleeves are brought into engagement with bevel wheels 7 and 8 thus rotating their screw shafts 9 and 10, engaging by means of threaded portions with the bearing frame $d$, and raising the latter. In this manner the compression space of the engine cylinders $h$ and $k$ is reduced.

To simplify the example illustrated variation of the compression space of the charging pumps is allowed.

In the drawing the centrifugal governor has just reached its highest position.

As it falls the centrifugal governor $r$ opens the valves 15, 16 in the pipes $l$ and $z$ more and more and finally at a certain speed moves the bevel wheels 11 and 12 on the sleeves 3 and 4 into engagement with the bevel wheels 7 and 8 respectively so that the shafts 9 and 10 lower the bearing frame $d$.

If as illustrated the pump shaft is connected rigidly with the shaft of the engine, the consumption of energy by the pumps is preferably regulated in accordance with their output. This may be effected by producing, as soon as the pumps must no longer supercharge, a vacuum in the pump cylinders in any desired manner as by closing the valves 15. The resistance due to work done in pumping action is thus obviated, as the pump is effectively unloaded at low supercharging values.

What we claim is:—

1. In a supercharger internal combustion engine, a power cylinder having a piston, a shaft operatively connected with said piston to be driven thereby, a supercharging pump connected to said shaft to be driven therefrom, means to vary the positions of the power pistons relatively to the cylinders at the phases of minimum compression volume, means for varying the effective discharge of the said pump so as to maintain at all engine speeds a constant upper limit of compression pressure in the power cylinder, and devices for simultaneously accomplishing said variations.

2. An internal combustion engine as set forth in claim 1, in which the said devices operate to increase the supercharging with decreasing engine speed, and to decrease the supercharging with increasing engine speeds.

3. An internal combustion engine as set forth in claim 1, including a governor, means connected to said shaft to operate said governor in proportion to the engine speed, and a connection from said governor to said coordinating device whereby to actuate the latter.

4. In a supercharger internal combustion engine, a power cylinder having a piston, a shaft operatively connected with said piston to be driven thereby, a supercharging pump connected to said shaft to be driven positively therewith, means to regulate the delivery from the pump to the cylinder to produce high values of supercharging at low engine speeds, and means operating coordinately with said delivery-regulating means to unload the supercharger at low values of supercharging.

5. A supercharger internal combustion engine having a power cylinder with a piston, a shaft operatively connected with said piston to be driven thereby, a supercharging cylinder having a piston connected to said shaft to be driven therefrom, and adapted to provide said power cylinder with variable supercharges, means to vary simultaneously the chamber spaces in said cylinders in accordance with variations in said supercharges by relative movement of said shaft and cylinders, and a conduit connecting said pump cylinder and said power cylinder.

6. A supercharger internal combustion engine as in claim 5, including a governor driven from the shaft and responsive to the speed thereof, and devices connecting said governor and said relative varying means to increase the chamber space at low speeds of the engine.

7. A supercharger internal combustion engine having a power cylinder with a piston, a shaft connected with said piston to be driven thereby, a supercharging pump, a governor driven from the crank shaft and responsive to the speed thereof, a conduit connecting said pump and said power cylinder, and means controlled by said governor to restrict the cross-section of said conduit in proportion to engine speeds.

8. In an internal combustion engine having a working piston and cylinder and a power shaft operated thereby, a supercharger connected to said working cylinder, means to supercharge said cylinder more intensively at low engine speeds than at high engine speeds, means to control said supercharge whereby its action may be varied as the engine speed varies, and means to control compression ratios in said engine in accordance with the supercharging thereby to prevent pre-ignition.

9. In an internal combustion engine having a working piston and cylinder, and a power shaft operated thereby, a supercharger connected to said working cylinder, means to supercharge said cylinder more intensively at low engine speeds than at high engine speeds, and means operatively connected to said shaft for controlling said supercharging means in accordance with the speed of said shaft, and means to control compression ratios in accordance with the supercharging thereby to prevent pre-ignition.

10. The method of super-charging an engine which consists in introducting to the working cylinders a greater supercharge at low engine speed than at high engine speed, and varying compression ratios in the engine in accordance with the intensity of the supercharging.

11. The method of supercharging an engine which consists in introducing to the working cylinders a greater supercharge at low engine speed than at high engine speed, varying said introduced supercharge in an inverse proportion to the engine speeds, and varying compression ratios in the engine in accordance with the intensity of the supercharging.

12. In an internal combustion engine having a working piston and cylinder and a power shaft operated thereby, a supercharger connected to said working cylinder, means to supercharge said cylinder more intensively at low engine speeds than at high engine speeds, and means to control compression ratios in said engine in accordance with the supercharging, thereby to prevent pre-ignition.

In testimony whereof we have affixed our signatures.

MANFRED SENG.
ANTHONY GEORGE MALDON MICHELL.